United States Patent
Schaefer et al.

(10) Patent No.: US 12,271,710 B2
(45) Date of Patent: Apr. 8, 2025

(54) ELIDABLE TEXT FOR PROMPT CRAFTING

(71) Applicant: MICROSOFT TECHNOLOGY LICENSING, LLC., Redmond, WA (US)

(72) Inventors: Max Schaefer, Kidlington (GB); Albert Ziegler, Uppsala (SE)

(73) Assignee: Microsoft Technology Licensing, LLC., Redmond, WA (US)

( * ) Notice: Subject to any disclaimer, the term of this patent is extended or adjusted under 35 U.S.C. 154(b) by 149 days.

(21) Appl. No.: 18/198,127

(22) Filed: May 16, 2023

(65) Prior Publication Data

US 2024/0311093 A1    Sep. 19, 2024

Related U.S. Application Data

(60) Provisional application No. 63/452,664, filed on Mar. 16, 2023.

(51) Int. Cl.
*G06F 8/33* (2018.01)
*G06F 8/30* (2018.01)

(52) U.S. Cl.
CPC .  *G06F 8/33* (2013.01); *G06F 8/37* (2013.01)

(58) Field of Classification Search
CPC ..................................... G06F 8/33; G06F 8/37
See application file for complete search history.

(56) References Cited

U.S. PATENT DOCUMENTS

| | | | |
|---|---|---|---|
| 2022/0398462 A1* | 12/2022 | Clement | G06N 3/088 |
| 2023/0073052 A1* | 3/2023 | Mohylevskyy | G06N 3/0455 |
| 2023/0325725 A1* | 10/2023 | Lester | G06N 3/0455 |

FOREIGN PATENT DOCUMENTS

CN    112527273 A   *   3/2021   ............... G06F 8/33

OTHER PUBLICATIONS

Ma et al. "Enhancing source code classification effectiveness via prompt learning incorporating knowledge features" (Year: 2024).*
Wang et al. "Prompt Tuning in Code Intelligence: An Experimental Evaluation" (Year: 2023).*
Sun et al. "A Prompt Learning Framework for Source Code Summarization" (Year: 2023).*
Kim et al. "Code Prediction by Feeding Trees to Transformers" (Year: 2021).*

(Continued)

*Primary Examiner* — Phillip H Nguyen

(57) ABSTRACT

An elidable text is constructed that prioritizes the content included in a prompt to a large language model having a fixed-size context window. The elidable text is generated from developer-generated instructions or automatically for source code within a source code editor. A source code editor may include a feature that selects certain lines of code as important or focused which are assigned a high-priority value. A changed line, a line of source code at a current cursor position, lines of source code at the beginning of a file and those that output data are considered focused lines. Non-focused lines are assigned a priority based on a distance from a focused line. The elidable text constrains the data included in a prompt to the context window size by replacing the lowest-valued lines of text and source code with a replacement string.

20 Claims, 5 Drawing Sheets

(56) References Cited

OTHER PUBLICATIONS

"GitHub Copilot—Wikipedia" accessed on URL: https://en.wikipedia.org/w/index.php?t%20itle=GitHub%20Copilot&oldid=1144127997, May 31, 2024, 6 pages.
International Search report and Written opinion received in PCT Application No. PCT/US2024/018757, mailed on Jun. 14, 2024, 16 pages.
Khalifa, et al., "Few-shot Reranking for Multi-hop QA via Language Model Prompting", aRxiv.org, Cornell University, Feb. 13, 2023, 14 pages.
Rice, et al., "Copilot for Pull Requests", Retrieved from: https://githubnext.com/projects/copilot-for-pull-requests/, Retrieved Date: Feb. 28, 2023, 13 Pages.
Ziegler, et al., "Crafting Code Suggestions using Large Language Models", Retrieved from: https://docs.google.com/presentation/d/1MmTaKUOXu7fL6hljbLvIJ1WIVM3Wy16rQVZ6ZBB0DzY/edit#slide=id.glee107a4c67_0_42, Feb. 6, 2023, 25 Pages.

\* cited by examiner

ELIDABLE TEXT FOR PROMPT CRAFTING

CROSS-REFERENCE TO RELATED APPLICATIONS

The present application claims the benefit of the earlier filed provisional application having Ser. No. 63/452,664 filed on Mar. 16, 2023, entitled "Elidable Text For Prompt Crafting", which is incorporated by reference in its entirety.

BACKGROUND

A large language model is a type of machine learning model trained on a massively-large training dataset of text and/or source code resulting in the model containing billions and more parameters. The large language model is used to perform various tasks such as natural language processing, text generation, machine translation, and source code generation. The large language model is based on deep learning neural networks such as a neural transformer model with attention.

The large language model is given a prompt which is an input sequence of tokens that the model processes to make a prediction or output. The context window is the collection of tokens that the model can access and use in its predictions. The size of the context window dictates the number of tokens that can be used in the prompt. At times, the limited context window becomes challenging when the model needs a considerable amount of background information to make a prediction that exceeds the size of the context window.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An elidable text is used to prioritize the content included in a prompt to a large language model to fit within a fixed-size context window and assemble a shortened prompt based on the priorities. The elidable text is generated from developer-generated instructions or automatically for source code, such as within a source code editor. The source code editor or other code processing system may include a feature that selects certain lines of code as important or focused which are assigned a high-priority value. Non-focused lines are assigned a priority based on a semantic distance from a focused line. A changed line, lines of source code at the beginning of a file and those that output data are considered focused lines. The elidable text constrains the data included in a prompt to the context window size by replacing the lowest-valued lines of text and source code with a replacement string.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to an automated system for generating an elidable text and the use of an elidable text to constrain a prompt to a large language model to fit within the size of a context window of the large language model. The elidable text prioritizes lines of text and source code with a priority value indicating the importance of each line in a prompt. In an aspect, the value may range from 0 to 1 where 1 is the highest value and 0 is the lowest value. The elidable text is used to replace the lowest-valued lines of text and source code with a replacement string, such as a bracketed ellipsis, [ . . . ].

The elidable text may be generated by a developer. In an aspect, a developer may explicitly generate an elidable text class. The input to the creation class may include a data structure (i.e., constant, array, etc.) that includes a prioritized order of text and source code lines, or blocks of source code, as well as optionally other previously-constructed elidable texts, with each having a priority value. The elidable text class may contain functions that perform the reduction analysis of the input data using the prioritized list.

In an aspect, the elidable texts may be created automatically without the developer's involvement. An elidable text generator interacts with a source code editor to select certain lines of source code as focused lines which are assigned a high-priority value. Depending on previously set options, the focused lines include lines of source code at a current cursor position, changed lines of code, and lines of source code at the start of a program and lines of code that output data. The elidable text generator assigns priorities to the remaining lines of source code based on a distance measure from a focused line. The source code editor may utilize a code completion feature that generates code completion candidates to complete a partially-formed source code snippet. The prompt crafting engine may then generate a prompt for the large language model to generate the code completion candidate using the elidable text to prioritize the lines of text and source code included in the prompt.

Attention now turns to a system, device, and method of the elidable text prompt crafting system.

System

Figure 1:
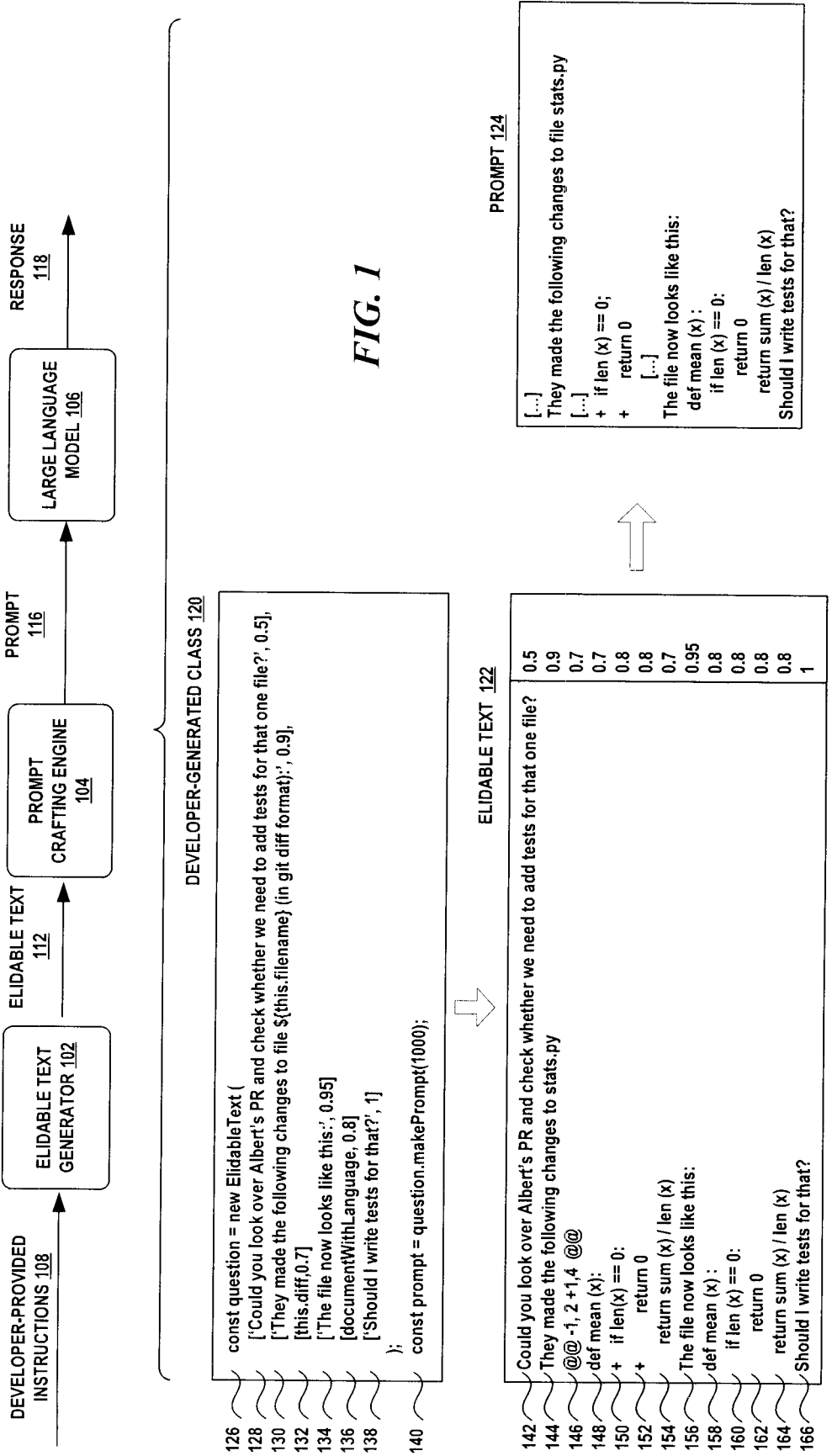
FIG. 1 illustrates an exemplary system of creating elidable text and generating a prompt for a large language model based on developer-generated instructions.

FIG. 1 represents an exemplary system 100 for creating a prompt using an elidable text based on developer-provided instructions. The system 100 includes an elidable text generator 102, a prompt crafting engine 104, and a large language model 106. The elidable text generator 102 receives instructions 108 that specify how to generate an elidable text. The prompt crafting engine 104 generates the prompt 116 using the elidable text 112 which is applied to the large language model 106 to predict a response 118.

In an aspect, the prompt 116 includes a question and the large language model 106 responds by predicting a response to the question. In an aspect, the question includes instructions on a task that the model is to perform and a context that includes source code used to perform the task.

In an aspect, the developer-generated instructions may be implemented as a class having a constant 126 describing the priority order of the data to be included in the prompt 128-138 and a method 140 to generate the prompt. Box 120 illustrates an exemplary construction of an object-oriented class, question, written in the TypeScript programming language which contains an Elidable Text as a constant 126 composed of six lines and the makePrompt method 140. The makePrompt method 140 includes a parameter indicating the prompt length which is the maximum number of tokens included in the prompt.

The construction of the Elidable Text 128-138 includes a text string 128 having a value of 0.5, a text string 130 having a value of 0.9, a diff file 132, this.diff, having a value of 0.7, a text string 134 having a value of 95, a source code file 136 having a value of 0.8, and a text string 138 having a value of 1.

The elidable text generator 102 transforms the developer-provided instructions into an elidable text object 122 of prioritized lines of text and source code 142-166. For instance, lines 146-154 are the lines from the file, this.diff. Each line from this.diff is included in the elidable text 122 with a corresponding priority value. Lines 160-164 include the lines of source code from the source code file documentWithLanguage each with a corresponding priority value.

The prompt crafting engine 104 generates the prompt 124 using the elidable text 122. The data in the prompt is ordered in the same order listed in the elidable text 122. The eliminated lines which are replaced with the bracketed ellipsis, [ . . . ], include lines 142, 146-148, and 154. The bracketed ellipsis is indented with the same spacing as the eliminated lines.

In an aspect, the large language model 106 is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention. In an aspect, the large language model may be configured as an encoder-decoder neural transformer model with attention or a decoder-only neural transformer model with attention. An encoder-decoder transformer model with attention consists of a series of stacked encoder blocks coupled to a series of stacked decoder blocks. The encoder blocks extract features from an input sequence to generate embeddings for each token in the input sequence, and the decoder uses the features to produce an output sentence. The decoder neural transformer model with attention contains a series of stacked decoder blocks.

The large language model is pre-trained on natural language text and source code. Examples of the neural transformer models with attention include OpenAI's GPT models and OpenAI's Codex model. In an aspect, the large language model is hosted on an external server and accessed over a network through application programming interfaces (API). The training of a large language model requires a considerable amount of training data and computing resources which makes it impossible for some developers to create their own models. Instead, third-parties having created a large language model may offer access to the large language model as a cloud service to developers with or without a fee.

The input or prompt to the large language model is constrained to the size of the context window of the large language model. A context window is the number of tokens that the large language model can process in a forward pass. The tokens represent the natural language text and source code contained in the prompt. Each token corresponds to a small group of characters. The size of a context window varies and may include 4096 tokens, such as with Github's CoPilot Codex to 32,000 tokens for OpenAI's GPT-4 model.

Figure 2:
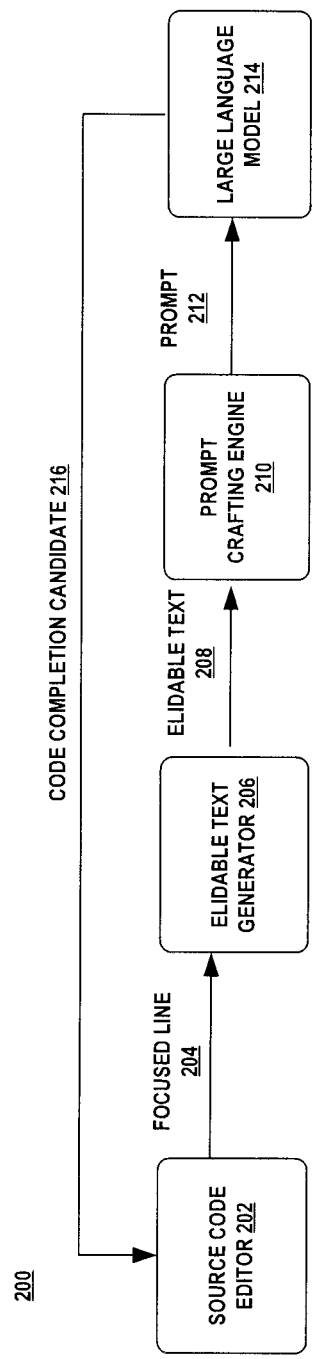
FIG. 2 illustrates an exemplary system of creating elidable text automatically based on user actions in a source code editor.

FIG. 2 illustrates an exemplary system 200 for creating a prompt using an elidable text generated from actions of a user while in a source code editor. The system 200 includes a source code editor 202, an elidable text generator 206, a prompt crafting engine 210, and a large language model 214. The elidable text generator 206 identifies focused lines 204 in the source code program that are considered important, such as the line where the cursor is currently positioned in the editor or lines that have been changed since the last time the document was saved. Alternatively, the elidable text generator 206 may use a default setting that considers lines in the beginning of the file and at the end of the file important.

The prompt crafting engine 210 generates the prompt 212 using the elidable text 208 which is applied to the large language model 214 to predict a response, such as a code completion candidate 216. The prompt may include a context of a partially-formed source code snippet under development in the source code editor. The elidable text is used to constrain the size of the prompt to the context window size of the large language model.

Methods.

A description of the various exemplary methods that utilize the system and devices is disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
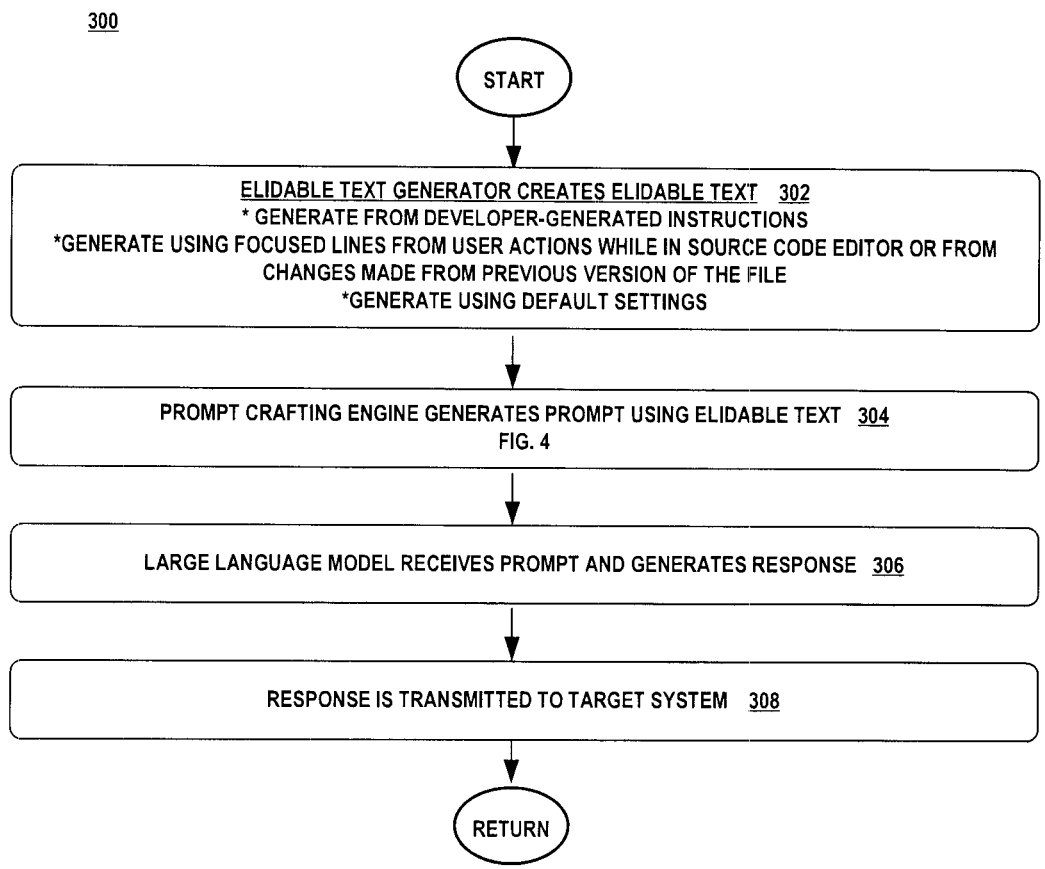
FIG. 3 is a flow chart illustrating an exemplary method of the system for creating the elidable text and the prompt.

FIG. 3 illustrates an exemplary method 300 of the prompt-crafting system. The elidable text may be generated by a developer or automatically-generated from code changes, code edits, using a default setting (block 302). The prompt crafting engine uses the elidable text to generate a prompt within the context window size by replacing lines of text and source code having low-priority values with a replacement string (block 304). The prompt is then sent to the large language model which generates a response (block 306) that is output by a target system (block 308).

In an aspect, the elidable text may be generated from developer-generated instructions (block 302). The developer-generated instructions may call a software package with instructions and files used to generate the prompt. The instructions and file constitute a list of blocks of text, code, or previously constructed ElidableTexts, optionally together with priority value or lines of code specified as focused lines. The package may include a class, Elidable Text, that when instantiated processes its inputs to generate an object, ElidableText, containing lines of text and source code with a corresponding priority value. The lines of text and source code are listed in the order they are meant to appear in the prompt. The priority values guide the selection of which lines of text or source code are to be included in the prompt. The package may include the function, makePrompt, which when executed generates the prompt. In this scenario, the makePrompt function is the prompt crafting engine.

In another aspect, the elidable text may be automatically generated for source code in a source code editor or other source code processing tools (302). A background process of the source code editor transforms the source code into an indentation tree. An indentation tree shows a hierarchical relationship between the different code elements. An indentation is a collection of white spaces added to the beginning of a code statement or a block of code. Source code statements within the same indentation belong to the same code block. The number of white spaces of an indentation represents an indentation level. The different indentation levels represent a relationship between the source code statements, such as parent, child, and sibling.

In an aspect, the developer may select one or several source code statements as a focused line or the elidable text generator may select a line in the current cursor position as the focused line. For each non-focused line, the distance from the non-focused line to a focus line is computed using a distance metric. The distance metric is used to set the line's priority value. A line that is further away from the focus line is given a lower-priority value and a line that is closer to the focus line is given a higher-priority value. In an aspect, the term "distance" refers to the tree distance or the total weight of the shortest path to a focused line, where traversals from parent to child, traversals from child to parent, and traversals between siblings all have a preconfigured weight.

Additionally, if the source code file has changes from a previous version of the file, then the changed lines are considered focused lines (302). The changes may be displayed in the source code editor in a diff format where lines that were added have a '+' character prepended to the line and lines that are deleted from a file have a '-' character prepended to the line. The lines that have been added are considered a focused line and given a higher-priority value while lines not changed are given a lower-priority value.

Furthermore, a default setting may be used (block 302). In this case, the important code is considered to be at the beginning of the file, such as in import statements and preamble comments, and the statements at the end of the file, such as data output. The source code is parsed into an indentation tree and the first line of the indentation tree is typically an import statement and/or preamble comments which are given a high-priority value. The leaves of the indentation tree generally contain individual statements rather than blocks of statements. Some of these lines may produce outputs and are given a high-priority value.

Figure 4:
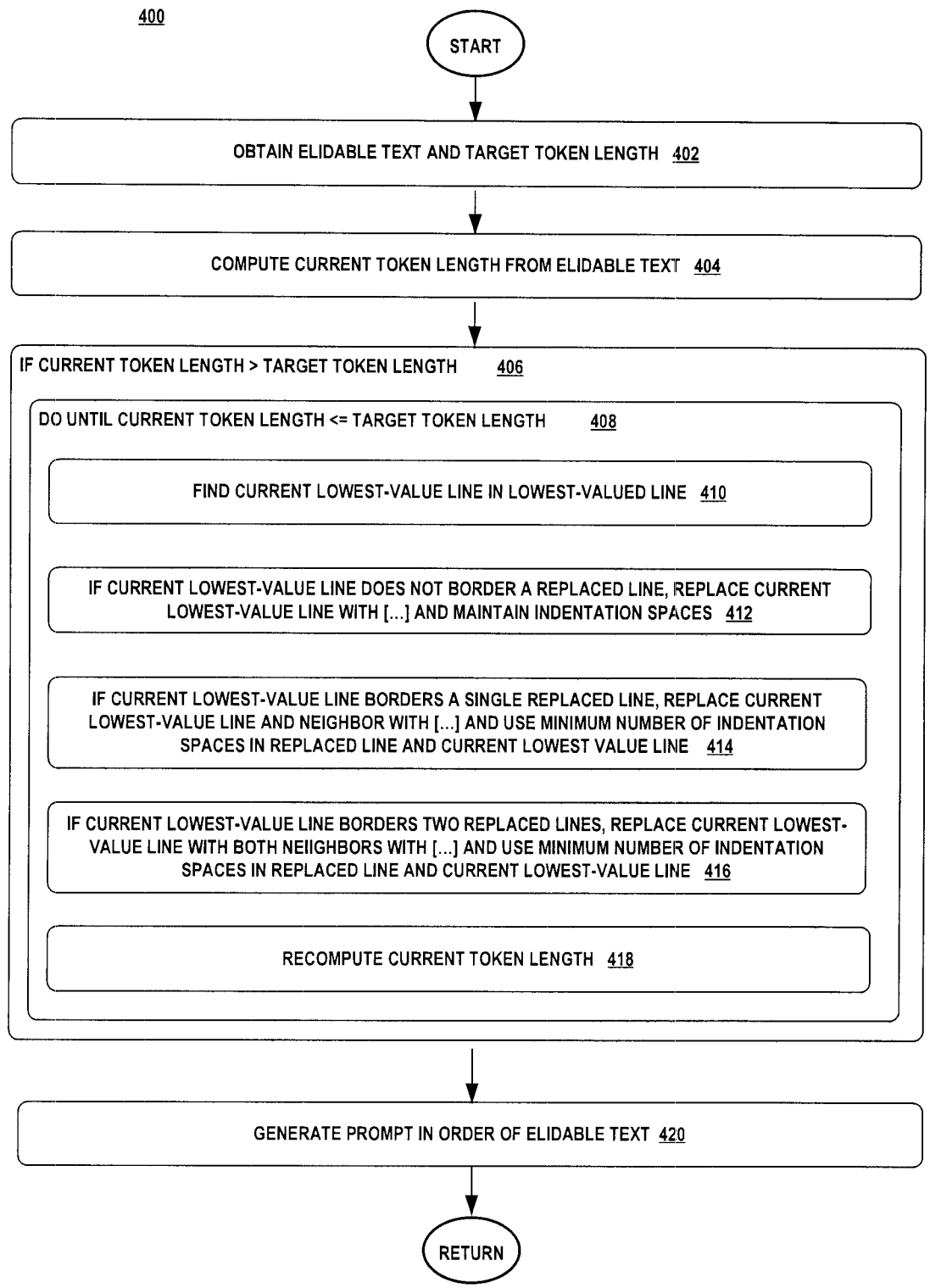
FIG. 4 is a flow chart illustrating an exemplary method for the generation of a prompt within the fixed-size context window of a large language model using an elidable text.

FIG. 4 is an exemplary method 400 for generating a prompt using an elidable text to reduce the size of the prompt to fit within the context window. The prompt crafting engine receives an elidable text and a target token length for a prompt (block 402). In an aspect, the prompt crafting engine may be the makePrompt function of a developer-generated class.

The prompt crafting engine tokenizes each line of text and source code of the elidable text to determine the current token length (block 404). If the current token length is greater than the target token length of the context window (block 406), then the elidable text is used to replace portions of the text and/or source code with a replacement string, such as the bracketed ellipsis, until the target token length is met (block 408). The method starts by finding the lowest-valued line (block 410). If the current lowest-value line does not border another previously-replaced line, then the lowest-value line is replaced with the replacement string and positioned with the indentation spacing of the replaced line (block 412).

If the current lowest-value line borders a single previously-replaced line, then the current lowest-value line and the neighboring replacement string are replaced with a single bracketed ellipsis (block 414). The bracketed ellipsis is positioned with the minimum number of indentation spaces based on the position of the current lowest-level line and the position of the neighboring bracketed ellipsis (block 414).

If the current lowest-value line borders two previously-replaced lines, then the current lowest-value line and the neighboring replacement string are replaced with a single bracketed ellipsis (block 416). The new bracketed ellipsis is positioned with a minimum number of indentation spaces from the replacement string and the position of the current lowest-value line (block 416).

The prompt crafting engine then recomputes the current token length by subtracting out the tokens of the current lowest-value line that was replaced by the replacement string as well as potential token length savings through shortened indentation, and adding the cost of any inserted ellipsis lines (block 418). If the target token length is not met, then the process is repeated (blocks 406-418) until the target token length is achieved.

Once the target token length is achieved, the prompt is created in the order presented in the elidable text (block 420). As shown in the prompt 124 of FIG. 1, the elidable text lists the lines in the order they are meant to appear in the prompt. Lines 142, 146-148, 154 have been replaced with the replacement string and the order presented in the elidable text 122 is maintained in the prompt.

Exemplary Operating Environment

Figure 5:
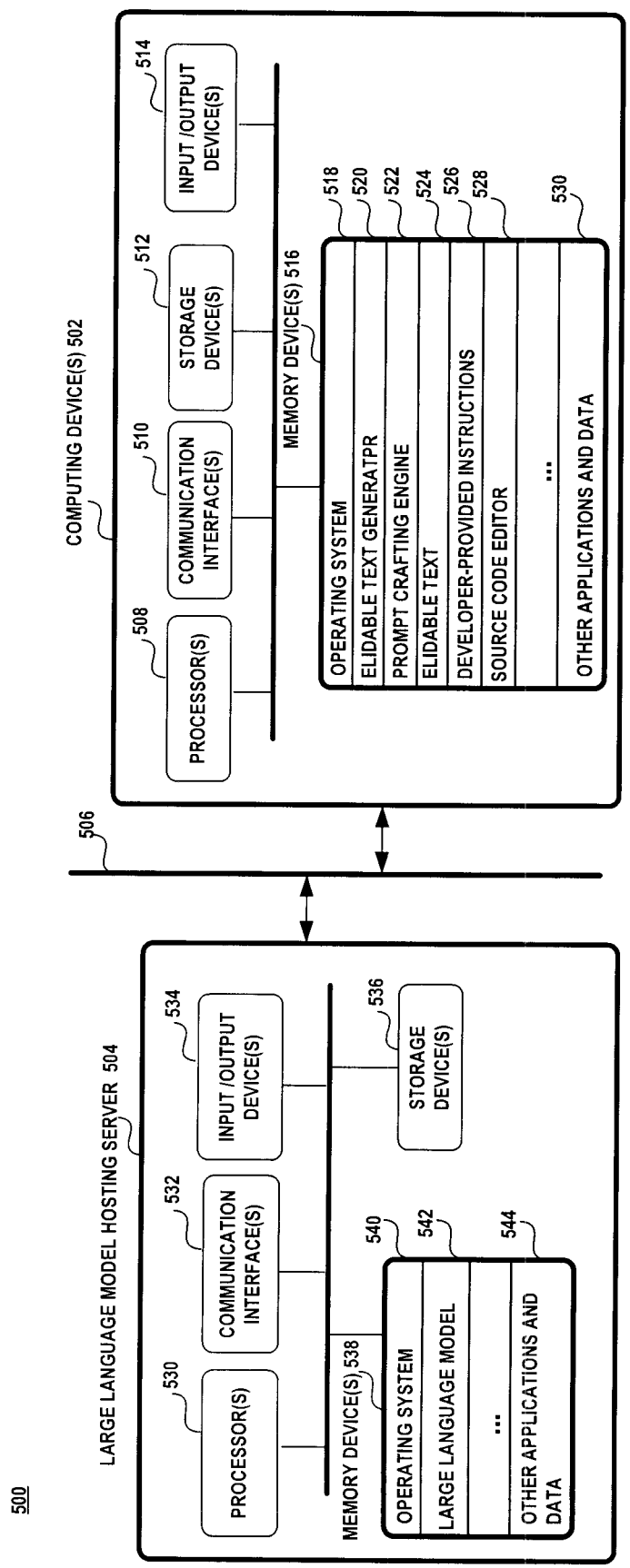
FIG. 5 is a block diagram illustrating an exemplary operating environment.

Attention now turns to a discussion of an exemplary operating environment. FIG. 5 illustrates an exemplary operating environment 500 in which one or more computing devices 502 are used to generate the elidable text and prompt and one or more computing devices 504 are used to host the large language model which uses the prompt to predict a response. However, it should be noted that the aspects disclosed herein is not constrained to any particular configuration of devices. In another aspect, a single computing device may host the large language model and generate the elidable text and the prompt.

A computing device 502, 504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 500 may be configured in a network environment, a distributed environment, a multi-processor environment, or a stand-alone computing device having access to remote or local storage devices.

The computing device 502, 504 may include one or more processors 508, 530, one or more communication interfaces 510, 532, one or more storage devices 512, 536, one or more input/output devices 514, 534, and one or more memory devices 516, 538. A processor 508, 530 may be any commercially available or customized processor and may include dual microprocessors and multi-processor architectures. A communication interface 510, 532 facilitates wired or wireless communications between the computing device 502, 504 and other devices. A storage device 512, 536 may be a computer-readable medium that does not contain propagating signals, such as modulated data signals transmitted through a carrier wave. Examples of a storage device 512, 536 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 512, 536 in a computing device 502, 504. The input/output devices 514, 534 may include a keyboard, mouse, pen, voice input device, touch input device, display, speakers, printers, etc., and any combination thereof.

A memory device or memory 516, 538 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 516, 538 may also include one or more external storage devices or remotely located storage devices that do not pertain to propagated signals, such as modulated data signals transmitted through a carrier wave.

The memory device 516, 538 may contain instructions, components, and data. A component is a software program that performs a specific function and is otherwise known as a module, program, component, and/or application. The memory device 516 may include an operating system 518, an elidable text generator 520, prompt crafting engine 522, elidable text 524, developer-provided instructions 526, a source code editor 528, and other applications and data 528. The memory device 538 may include an operating system 540, a large language model 542, and other applications and data 544.

A computing device 502 may be communicatively coupled via a network 506. The network 506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of crafting a prompt within the size of a context window of a large language model. The technical features associated with addressing this problem is the elidable text that specifies a prioritization of the data used in the prompt. The technical effect achieved is the construction of a prompt within the limits of the context window size using the most important context for the model to make a prediction without undue increased computational burden.

One of ordinary skill in the art understands that the technical effects are the purpose of a technical embodiment. The mere fact that a calculation is involved in an embodiment does not remove the presence of the technical effects or alter the concrete and technical nature of the embodiments. Operations used to create an elidable text and to create the prompt are understood herein as inherently digital. The human mind cannot interface directly with a CPU or network interface card, or other processor, or with RAM or other digital storage, to read or write the necessary data and perform the necessary operations on digital values in the manner disclosed herein.

The embodiments are also presumed to be capable of operating at scale, within tight timing constraints in production environments, or in testing labs for production environments as opposed to being mere thought experiments.

CONCLUSION

A system is disclosed, comprising: one or more processors; and a memory that stores one or more programs that are configured to be executed by the one or more processors. The one or more programs include instructions to perform acts that: access a large language model having a fixed-size context window, wherein the large language model generates a prediction for a task given a prompt; receive an elidable text, wherein the elidable text comprises an ordered list of data, wherein the ordered list of data includes lines of text and source code statements with an associated priority value; determine a size of the ordered list of data; when the size of the ordered list of data exceeds the fixed-size of the context window: select one item of the ordered list of data to exclude from the ordered list of data based on the priority value associated with each line; and replace the selected one item from the ordered list of data with a first replacement string; and construct the prompt for the large language model from the ordered list that meets the fixed-size of the context window.

In an aspect, the one or more programs include further instructions to perform acts that: submit the prompt to the large language model; and receive a response from the large language model responding to the prompt. In an aspect, the one or more programs include instructions to perform acts that: concatenate the first replacement string with an existing replacement string that borders the excluded item from the ordered list of data.

In an aspect, the one or more programs include instructions to perform acts that: create the elidable text from a source code program, wherein import statements of the source code program and statements that output data from the source code program having a high-priority value. In an aspect, the one or more programs including instructions to perform acts that: create the elidable text from focused lines of a source code program in a source code editor, wherein a focused line is associated with a high-priority value, wherein the focused line includes a source code line having been changed or at a current cursor position in the source code editor.

In an aspect, the one or more programs including instructions to perform acts that: associate a priority value to a non-focused line of the source code program based on a distance from the non-focused line to the focused line. In an aspect, the large language model is a neural transformer model with attention.

A computer-implemented method is disclosed, comprising: accessing a large language model accepting a prompt within a context window size; obtaining an elidable text comprising lines of text and lines of source code statements, wherein each line of text and each line of the lines of source code statements includes a priority value, wherein the large language model is associated with a context window; determining a size of the lines of text and the lines of source code statements; and when the size of the lines of text and the lines of source code statements exceeds a size of the context window: selecting ones of the lines of text and the lines of source code statements based on a lowest priority value; replacing, in the priority order, the select ones of the lines of text and the lines of source code statements with a replacement string; and constructing the prompt to the large language model with the data of the elidable text in the priority order.

In an aspect, the computer-implemented method, further comprises: creating the elidable text from developer-generated instructions, wherein the developer-generated instructions include a class having a first data element and a method for generating the prompt with the elidable text, wherein the first data element includes the order of the lines of text and the lines of source code statements.

In an aspect, the computer-implemented method, further comprises: combining each replacement string bordering a replaced item in the elidable text with a single replacement string. In an aspect, the computer-implemented method, further comprises: maintaining indentation of the lines of source code within the prompt. In an aspect, the computer-implemented method, further comprises: creating the elidable text from a focused line of a source code program, wherein the focused line is a changed line of source code, wherein the focused line is associated with a high-priority value; and associating a priority-value for a non-focused line based on a distance from the focused line.

In an aspect, the computer-implemented method, further comprises: creating the elidable text from a focused line of a source code program, wherein the focused line is a line of source code at a current cursor position in a source code editor, wherein the focused line is associated with a high-priority value; and associating a priority-value for a non-focused line based on a distance from the focused line.

In an aspect, the computer-implemented method, further comprises: creating the elidable text from an indentation tree of a source code program; and associating a high-priority value for a first source code line of the indentation tree and for a source code line of the indentation tree that outputs a value. In an aspect, the large language model includes a neural transformer model with attention.

A computer-implemented method is disclosed, comprising: accessing a large language model to perform a task given a prompt that fits within a context window size; monitoring a source code program in a software development tool; selecting a focus line from the source code program; associating a high-priority value to the focus line; associating a priority value to a non-focused line based on a distance from the focus line; constructing a prompt to the large language model from select lines of the source code program; replacing the select lines of the prompt with a replacement string based on a corresponding priority value when size of the prompt exceeds size of the context window size; and applying the prompt to the large language model for performance of the task.

In an aspect, selecting a focus line further comprises: selecting the focus line from on a current cursor position in the source code program, from a changed line, from a first line of the source code program and/or from a line of the source code program that outputs data.

In an aspect, replacing the select lines of the prompt with a replacement string based on a corresponding priority value when size of the prompt exceeds size of the context window size further comprises: maintaining an indentation associated with the replaced select lines in the prompt. In an aspect, the task is code completion. In an aspect, the large language model is a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:
1. A system comprising:
one or more processors; and
a memory that stores one or more programs that are configured to be executed by the one or more processors, the one or more programs including instructions to perform acts that;

access a large language model having a fixed-size context window, wherein the large language model generates a prediction for a task given a prompt;

receive an elidable text, wherein the elidable text comprises an ordered list of data, wherein the ordered list of data includes lines of text and source code statements with an associated priority value;

determine a size of the ordered list of data;

when the size of the ordered list of data exceeds the fixed-size of the context window:
select one item of the ordered list of data to exclude from the ordered list of data based on the priority value associated with each line; and
replace the selected one item from the ordered list of data with a first replacement string; and construct the prompt for the large language model from the ordered list that meets the fixed-size of the context window.

2. The system of claim 1, wherein the one or more programs include further instructions to perform acts that:
submit the prompt to the large language model; and
receive a response from the large language model responding to the prompt.

3. The system of claim 1, wherein the one or more programs including instructions to perform acts that:
concatenate the first replacement string with an existing replacement string that borders the excluded item from the ordered list of data.

4. The system of claim 1, wherein the one or more programs including instructions to perform acts that:
create the elidable text from a source code program, wherein import statements of the source code program and statements that output data from the source code program having a high-priority value.

5. The system of claim 1, wherein the one or more programs including instructions to perform acts that:
create the elidable text from focused lines of a source code program in a source code editor, wherein a focused line is associated with a high-priority value, wherein the focused line includes a source code line having been changed or at a current cursor position in the source code editor.

6. The system of claim 5, wherein the one or more programs including instructions to perform acts that:
associate a priority value to a non-focused line of the source code program based on a distance from the non-focused line to the focused line.

7. The system of claim 1, wherein the large language model is a neural transformer model with attention.

8. A computer-implemented method, comprising:
accessing a large language model accepting a prompt within a context window size;
obtaining an elidable text comprising lines of text and lines of source code statements, wherein each line of text and each line of the lines of source code statements includes a priority value, wherein the large language model is associated with a context window;
determining a size of the lines of text and the lines of source code statements; and
when the size of the lines of text and the lines of source code statements exceeds a size of the context window:
selecting ones of the lines of text and the lines of source code statements based on a lowest priority value;
replacing, in the priority order, the select ones of the lines of text and the lines of source code statements with a replacement string; and
constructing the prompt to the large language model with the data of the elidable text in the priority order.

9. The computer-implemented method of claim 8, further comprising:
creating the elidable text from developer-generated instructions, wherein the developer-generated instructions include a class having a first data element and a method for generating the prompt with the elidable text, wherein the first data element includes the order of the lines of text and the lines of source code statements.

10. The computer-implemented method of claim 8, further comprising:
combining each replacement string bordering a replaced item in the elidable text with a single replacement string.

11. The computer-implemented method of claim 10, further comprising:
maintaining indentation of the lines of source code within the prompt.

12. The computer-implemented method of claim 8, further comprising:
creating the elidable text from a focused line of a source code program, wherein the focused line is a changed line of source code, wherein the focused line is associated with a high-priority value; and
associating a priority-value for a non-focused line based on a distance from the focused line.

13. The computer-implemented method of claim 8, further comprising:
creating the elidable text from a focused line of a source code program, wherein the focused line is a line of source code at a current cursor position in a source code editor, wherein the focused line is associated with a high-priority value; and
associating a priority-value for a non-focused line based on a distance from the focused line.

14. The computer-implemented method of claim 8, further comprising:
creating the elidable text from an indentation tree of a source code program; and
associating a high-priority value for a first source code line of the indentation tree and for a source code line of the indentation tree that outputs a value.

15. The computer-implemented method of claim 8, wherein the large language model includes a neural transformer model with attention.

16. A computer-implemented method, comprising:
accessing a large language model to perform a task given a prompt that fits within a context window size;
monitoring a source code program in a software development tool;
selecting a focus line from the source code program;
associating a high-priority value to the focus line;
associating a priority value to a non-focused line based on a distance from the focus line;
constructing a prompt to the large language model from select lines of the source code program;
replacing the select lines of the prompt with a replacement string based on a corresponding priority value when size of the prompt exceeds size of the context window size; and
applying the prompt to the large language model for performance of the task.

17. The computer-implemented method of claim 16, wherein selecting a focus line further comprises:
selecting the focus line from on a current cursor position in the source code program, from a changed line, from a first line of the source code program and/or from a line of the source code program that outputs data.

18. The computer-implemented method of claim 16, wherein replacing the select lines of the prompt with a replacement string based on a corresponding priority value when size of the prompt exceeds size of the context window size further comprises:

maintaining an indentation associated with the replaced select lines in the prompt.

19. The computer-implemented method of claim 16, wherein the task is code completion.

20. The computer-implemented method of claim 16, wherein the large language model is a neural transformer model with attention.

* * * * *